United States Patent
Ni et al.

(10) Patent No.: US 12,045,126 B1
(45) Date of Patent: Jul. 23, 2024

(54) METHOD, DEVICE, AND COMPUTER PROGRAM PRODUCT FOR PROCESSING FAULTS

(71) Applicant: Dell Products L.P., Round Rock, TX (US)

(72) Inventors: Jiacheng Ni, Shanghai (CN); Zijia Wang, Weifang (CN); Jinpeng Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/108,048

(22) Filed: Feb. 10, 2023

(30) Foreign Application Priority Data

Dec. 30, 2022 (CN) .......................... 202211728609.1

(51) Int. Cl.
  *G06F 11/07* (2006.01)
  *G06N 3/08* (2023.01)
  *G06N 5/022* (2023.01)

(52) U.S. Cl.
  CPC ........ *G06F 11/079* (2013.01); *G06F 11/0727* (2013.01); *G06N 3/08* (2013.01); *G06N 5/022* (2013.01)

(58) Field of Classification Search
  CPC ..... G06F 11/079; G06F 11/0727; G06N 3/08; G06N 5/022

(Continued)

(56) References Cited

U.S. PATENT DOCUMENTS 9,092,802 B1 * 7/2015 Akella .................... G06F 16/36
9,245,232 B1   1/2016 Trautmann et al.
(Continued)

FOREIGN PATENT DOCUMENTS

CN    110363556 A    10/2019
CN    112053703 A    12/2020
(Continued)

OTHER PUBLICATIONS

J. Devlin et al., "BERT: Pre-training of Deep Bidirectional Transformers for Language Understanding," arXiv:1810.04805v2, May 24, 2019, 16 pages.

(Continued)

*Primary Examiner* — Yair Leibovich
(74) *Attorney, Agent, or Firm* — Ryan, Mason & Lewis, LLP (57) ABSTRACT

A method in an illustrative embodiment includes determining, by a first deep learning model on a storage device, whether a fault is caused by an environmental factor. The method further comprises: determining, by a second deep learning model on the storage device in response to determining that the fault is caused by the environmental factor, whether the fault can be solved locally in the storage device. The method further comprises: processing the fault according to a knowledge base in response to determining that the fault can be solved locally in the storage device. The method further comprises: sending the fault to a third deep learning model on a cloud device in response to determining that the fault cannot be solved locally in the storage device, the first deep learning model and the second deep learning model being obtained by model distillation of the third deep learning model.

20 Claims, 5 Drawing Sheets

(58) Field of Classification Search
USPC .......................................................... 714/26
See application file for complete search history.

(56) References Cited

U.S. PATENT DOCUMENTS

| | | | |
|---|---|---|---|
| 10,019,716 | B1 | 7/2018 | Ainslie et al. |
| 10,410,219 | B1 | 9/2019 | El-Nakib |
| 11,004,005 | B1 | 5/2021 | Sirois |
| 11,388,244 | B1 | 7/2022 | Ni et al. |
| 11,521,087 | B2 | 12/2022 | Ni et al. |
| 2018/0253735 | A1 | 9/2018 | Bedoun et al. |
| 2019/0034937 | A1 | 1/2019 | Zhang et al. |
| 2019/0286486 | A1 | 9/2019 | Ma et al. |
| 2020/0241861 | A1 | 7/2020 | Zhang et al. |
| 2021/0142212 | A1 | 5/2021 | Li et al. |
| 2021/0406730 | A1 | 12/2021 | Ni et al. |

FOREIGN PATENT DOCUMENTS

| | | |
|---|---|---|
| CN | 108958939 B | 12/2021 |
| CN | 113868368 A | 12/2021 |

OTHER PUBLICATIONS

A. Vaswani et al., "Attention Is All You Need," arXiv:1706.03762v5, 31st Conference on Neural Information Processing Systems, Dec. 6, 2017, 15 pages.

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781v3, Sep. 7, 2013, 12 pages.

G. S. Manku et al., "Detecting Near-Duplicates for Web Crawling," Proceedings of the 16th International Conference on World Wide Web. May 8-12, 2007, 9 pages.

U.S. Appl. No. 17/990,885 filed in the name of Jiacheng Ni et al. on Nov. 21, 2022, and entitled "Method, Device, and Computer Program Product for Fault Diagnosis."

U.S. Appl. No. 18/071,247 filed in the name of Jiacheng Ni et al. on Nov. 29, 2022, and entitled "Method, Electronic Device, and Computer Program for Retrieving Service Request."

* cited by examiner

FIG. 5 ns. At the same time,
METHOD, DEVICE, AND COMPUTER PROGRAM PRODUCT FOR PROCESSING FAULTS

RELATED APPLICATION

The present application claims priority to Chinese Patent Application No. 202211728609.1, filed Dec. 30, 2022, and entitled "Method, Device, and Computer Program Product for Processing Faults," which is incorporated by reference herein in its entirety.

FIELD

Embodiments of the present disclosure generally relate to the technical field of computers, and more specifically to a method, a device, and a computer program product for processing faults.

BACKGROUND

With the development of natural language processing technology, deep learning models play an increasingly important role in the field of intelligent diagnosis. Compared with manual work, deep learning models can handle most common situations with fast response and low cost, and can improve the efficiency of an entire system. At the same time, knowledge distillation can be performed on deep learning models so that they can be deployed on local devices, thus saving computing resources.

Compared with models deployed on cloud devices, models deployed on local devices tend to provide faster response and better experience. However, the models on local devices are obtained through knowledge distillation of cloud models, so the effect of the models is not as good as the cloud models.

SUMMARY

Embodiments of the present disclosure provide a method, a device, and a computer program product for processing faults.

In a first aspect of the present disclosure, a method for processing faults is provided. The method includes: determining, by a first deep learning model on a storage device, whether a fault is caused by an environmental factor; determining, by a second deep learning model on the storage device in response to determining that the fault is caused by the environmental factor, whether the fault can be solved locally in the storage device; processing the fault according to a knowledge base in response to determining that the fault can be solved locally in the storage device; and sending the fault to a third deep learning model on a cloud device in response to determining that the fault cannot be solved locally in the storage device, the first deep learning model and the second deep learning model being obtained by model distillation of the third deep learning model.

In another aspect of the present disclosure, an electronic device is provided. The device includes a processing unit and a memory, where the memory is coupled to the processing unit and stores instructions. The instructions, when executed by the processing unit, cause the electronic device to perform the following actions: determining, by a first deep learning model on a storage device, whether a fault is caused by an environmental factor; determining, by a second deep learning model on the storage device in response to determining that the fault is caused by the environmental factor, whether the fault can be solved locally in the storage device; processing the fault according to a knowledge base in response to determining that the fault can be solved locally in the storage device; and sending the fault to a third deep learning model on a cloud device in response to determining that the fault cannot be solved locally in the storage device, the first deep learning model and the second deep learning model being obtained by model distillation of the third deep learning model.

In still another aspect of the present disclosure, a computer program product is provided. The computer program product is tangibly stored on a non-transitory computer-readable medium and includes computer-executable instructions, wherein the computer-executable instructions, when executed by a computer, cause the computer to perform the method or process according to embodiments of the present disclosure.

This Summary part is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be viewed as being limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

When deploying a deep learning model for processing faults, because the model needs high model effect, the model is often designed to be complex, resulting in a large model, which requires a large amount of computing resources, and is thus not conducive to local deployment. The present disclosure obtains a small deep learning model by performing knowledge distillation on the original deep learning model, which can respond to a user's problem faster and improve the user experience while facilitating local deployment. At the same time, when the user's problem cannot be solved through the local model, a cloud model can be used to solve it without affecting the final use effect.

To this end, embodiments of the present disclosure provide techniques for deploying deep learning models on both a local storage device and a cloud device to process faults. In embodiments of the present disclosure, by performing knowledge distillation on a cloud model, a first deep learning model and a second deep learning model for deployment in the local storage device are obtained, so that the need to process a user's problem locally can be met, and at the same time, when the user's problem cannot be solved locally, it can be solved through a third deep learning model at the cloud.

Basic principles and several example implementations of the present disclosure are illustrated below with reference to FIG. 1 to FIG. 5. It should be understood that these example embodiments are given only to enable those skilled in the art to better understand and thus implement embodiments of the present disclosure, and are not intended to limit the scope of the present disclosure in any way.

Figure 1:
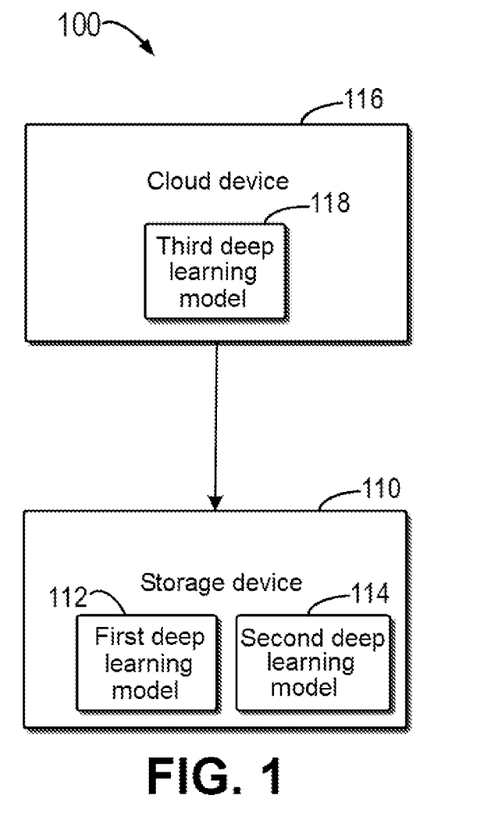
FIG. 1 illustrates a schematic diagram of the architecture of a portion of an example system according to the present disclosure.

FIG. 1 illustrates a schematic diagram of the architecture of a portion of an example system 100 according to the present disclosure. Referring to FIG. 1, example system 100 comprises storage device 110 and cloud device 116, wherein storage device 110 comprises first deep learning model 112 and second deep learning model 114 that are deployed on it, and cloud device 116 comprises third deep learning model 118 that is deployed on it. It should be understood that example system 100 may also include one or more other components not shown.

In some embodiments, first deep learning model 112 is a binary classification model. For example, for a problem that needs to be solved, the user provides the title and the description of the problem, and first deep learning model 112 can make a preliminary judgment on the problem to determine whether the problem can be solved locally. If it is judged that the problem can be solved locally, the title and the description of the problem can be provided to second deep learning model 114 for subsequent processing. It can be understood that first deep learning model 112 can be obtained through knowledge distillation of third deep learning model 118, because both of them implement semantic modeling of the user's problem and learn the same knowledge. In some embodiments, first deep learning model 112 can be trained separately by constructing features and training data.

In some embodiments, second deep learning model 114 is a multi-classification model. If it is determined through judgment by first deep learning model 112 that the user's problem can be solved locally, the problem can continue to be processed by second deep learning model 114. The multi-classification result of the processing corresponds to a pre-built knowledge base, so the user can process the problem and the fault through instructions of the knowledge base. It can be understood that second deep learning model 114 can be obtained through knowledge distillation of third deep learning model 118, because both of them implement semantic modeling of the user's problem and learn the same knowledge. By deploying the distilled model on storage device 110, it is possible to save local computing resources and respond to the user's problem faster. In some embodiments, first deep learning model 112 can be trained separately by constructing features and training data.

In some embodiments, third deep learning model 118 is a multi-classification model. If it is determined through judgment by first deep learning model 112 that the user's problem cannot be solved locally, the problem can be continued to be processed by third deep learning model 118. Since third deep learning model 118 is deployed on cloud device 116, it can be understood that third deep learning model 118 may be the largest original model. Third deep learning model 118 is trained through a large amount of training data to obtain a good model effect. For example, third deep learning model 118 can be modeled through a Bidirectional Encoder Representations from Transformers (BERT) model so as to fully learn the semantic knowledge in the user's problem. In some embodiments, cloud device 116 may include any public cloud, private cloud or hybrid cloud, community cloud, distributed cloud, inter-cloud, multi-cloud, or any combination thereof.

Figure 2:
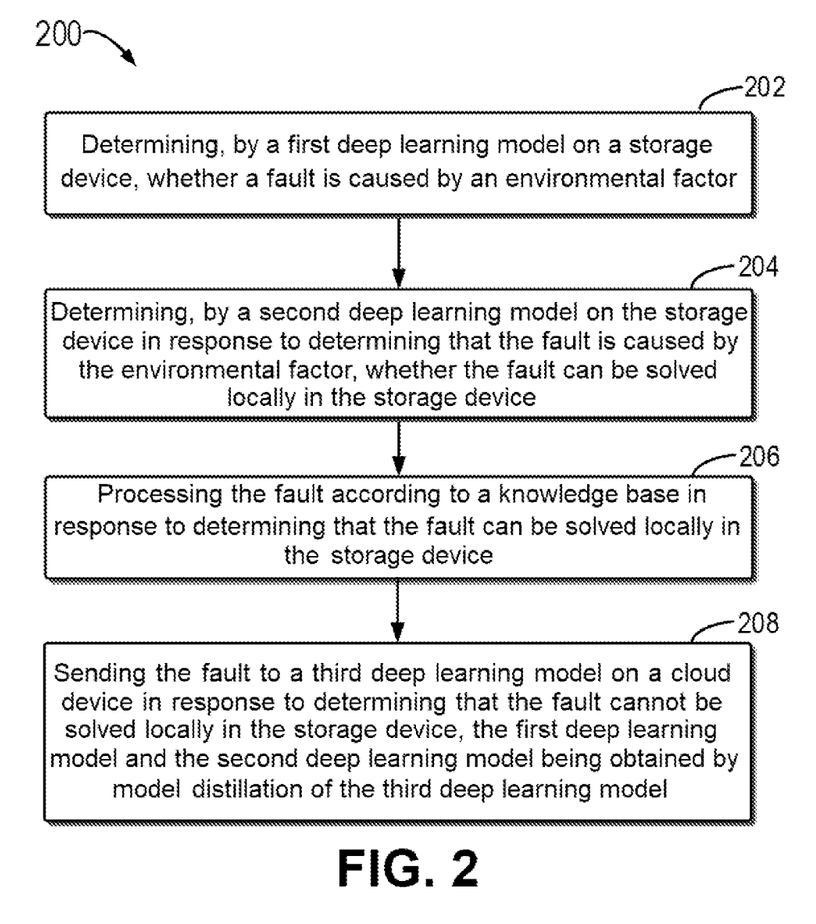
FIG. 2 illustrates a flow chart of a method for processing faults according to an embodiment of the present disclosure.

FIG. 2 illustrates flow chart 200 of a method for processing faults according to an embodiment of the present disclosure. At 202, it is determined, by a first deep learning model on a storage device, whether a fault is caused by an environmental factor. For example, if it is determined that the fault is caused by the environmental factor, the user can solve the problem by himself or herself under the guidance of the knowledge base. The first deep learning model only needs to make a preliminary judgment on the problem, so it can be implemented by using a binary classification model. In some embodiments, the first deep learning model on the storage device can be a small model obtained after knowledge distillation, so it is more convenient to deploy and can save computing resources. At the same time, because of the processing of knowledge distillation, the number of parameters of the model is reduced, so it can respond to the user's request faster.

At 204, it is determined, by a second deep learning model on the storage device in response to determining that the fault is caused by the environmental factor, whether the fault can be solved locally in the storage device. For example, through the second deep learning model on the storage device, multi-classification can be performed on the user's problem to determine whether the fault can be solved locally in the storage device. For example, problems such as network disconnection, disk damage, and power failure can be solved locally in the storage device.

At 206, the fault is processed according to a knowledge base in response to determining that the fault can be solved locally in the storage device. For example, according to a multi-classification result of the second deep learning model, different results correspond to different processing manners in the knowledge base. For example, if it is classified as a network configuration problem, reconfiguration can be performed according to the guidance of the knowledge base, and if it is classified as a power failure, the system can be reset according to the guidance of the knowledge base, and so on.

At 208, the fault is sent to a third deep learning model on a cloud device in response to determining that the fault cannot be solved locally in the storage device, the first deep learning model and the second deep learning model being obtained by model distillation of the third deep learning model. For example, in some embodiments, if it is determined that the fault cannot be solved locally in the storage device, the fault may be processed on a cloud. Some faults may be caused by more complex reasons, so the third deep learning model on the cloud device is utilized for processing. For example, according to a classification result of the third deep learning model, the fault can be processed through a larger knowledge base or manually processed by IT support personnel.

Figure 3:
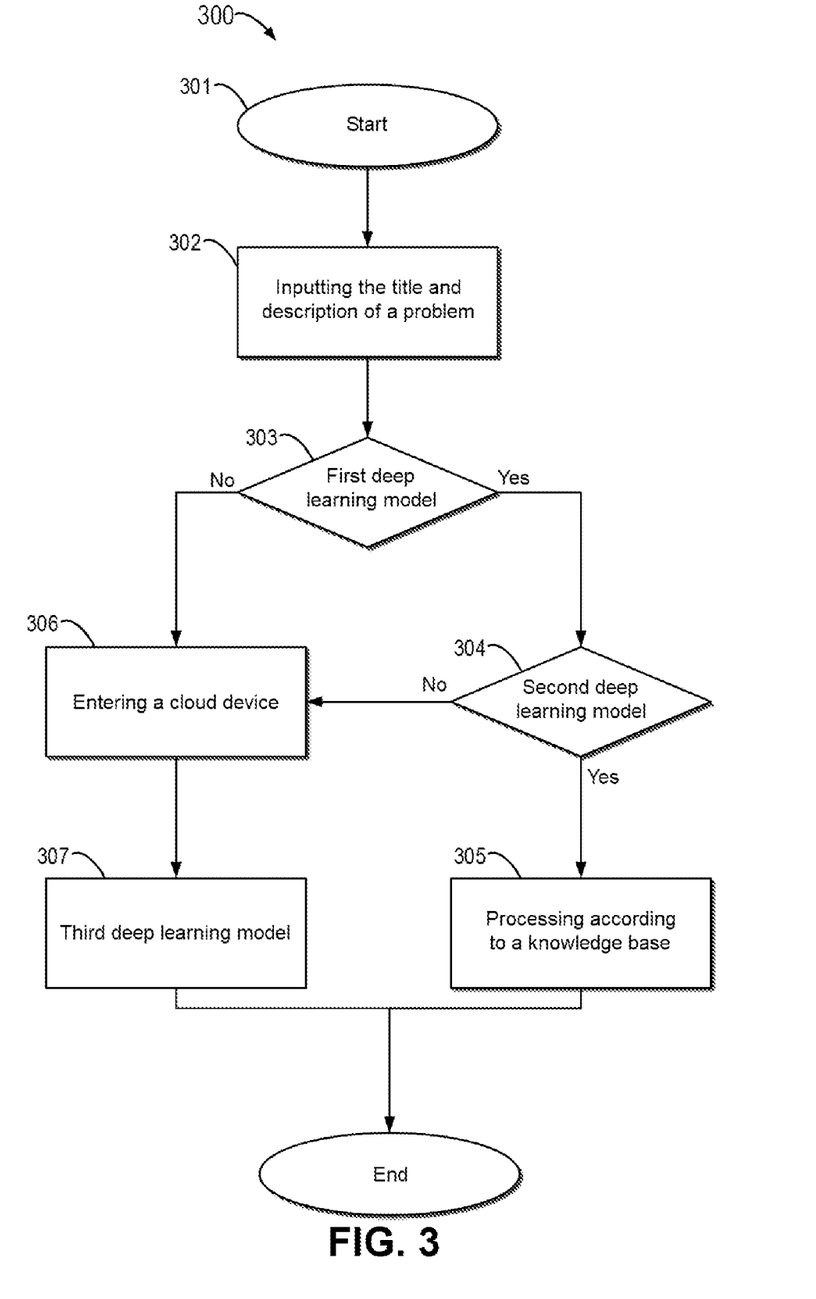
FIG. 3 illustrates an example flow chart for processing faults according to an embodiment of the present disclosure.

FIG. 3 illustrates example flow chart 300 for processing faults according to an embodiment of the present disclosure. At 301, the flow of processing a fault is started. At 302, the title and description of the problem are input. For example, the user describes a fault of a storage device and summarizes it as a title. This input needs to be pre-processed, and the title and the description are connected as a whole to serve as the input feature of a model. In some embodiments, the input title and description can be pre-processed in other forms so as to improve the effect of the model.

At 303, a first deep learning model is used to make a binary classification judgment to determine whether the problem input by the user at 302 is caused by an environmental factor. For example, if it is determined that the fault is caused by the environmental factor, the user can solve the problem by himself or herself under the guidance of the knowledge base. The first deep learning model only needs to make a preliminary judgment on the problem, so it can be implemented by using a binary classification model. In some embodiments, the first deep learning model on the storage device can be a small model obtained after knowledge distillation, so it is more convenient to deploy and can save computing resources. At the same time, because of the processing of knowledge distillation, the number of parameters of the model is reduced, so it can respond to the user's request faster. If it is determined at 303 that the problem is caused by the environmental factor, the process proceeds to 304 to use a second deep learning model.

At 304, it is determined, by a second deep learning model on the storage device in response to determining that the fault is caused by the environmental factor, whether the fault can be solved locally in the storage device. For example, through the second deep learning model on the storage device, multi-classification can be performed on the user's problem to determine whether the fault can be solved locally in the storage device. For example, problems such as network disconnection, disk damage, and power failure can be solved locally in the storage device, and then the process proceeds to 305 for processing according to the configuration of the knowledge base. For example, according to a multi-classification result of the second deep learning model, different results correspond to different processing manners in the knowledge base. For example, if it is classified as a network configuration problem, reconfiguration can be performed according to the guidance of the knowledge base, and if it is classified as a power failure, the system can be reset according to the guidance of the knowledge base, and so on.

If it is determined at 303 that the problem is not caused by an environmental factor, or if it is determined at 304 that the fault cannot be solved locally in the storage device, the process proceeds to 306. At 306, the input feature comprising the title and the description of the problem that is input by the user is transmitted to a cloud device. Here, the cloud device may include any public cloud, private cloud or hybrid cloud, community cloud, distributed cloud, inter-cloud, multi-cloud, or any combination thereof. After that, the process proceeds to 307. At step 307, the input feature is input into the third deep learning model on the cloud device, so as to process the user's problem.

Figure 4:
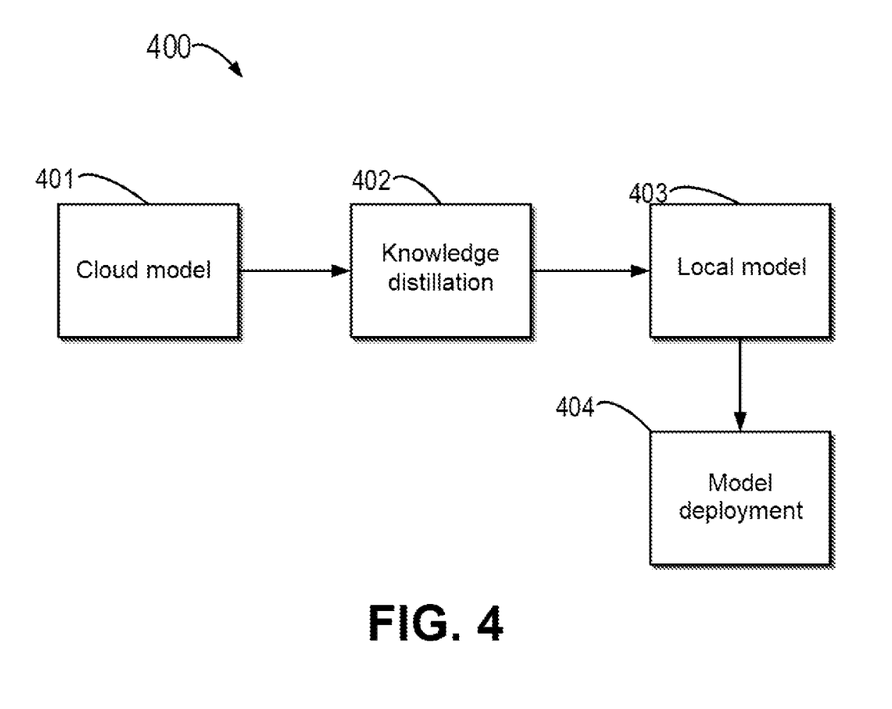
FIG. 4 is a process of model deployment according to an embodiment of the present disclosure.

FIG. 4 is process 400 of model deployment according to an embodiment of the present disclosure. At 401, a cloud model is obtained first. The cloud model is an original model in knowledge distillation, which is trained by means of semantic modeling of titles and descriptions of faults through the BERT model. Generally speaking, the cloud model is relatively large in size and has many parameters, which is not conducive to local deployment. In 402, knowledge transfer is carried out by means of distillation of the cloud model. For example, the knowledge contained in the trained cloud model is extracted into a local model. At 403, the local model can be obtained by means of knowledge distillation, wherein the local model can process user inputs. Moreover, compared with the cloud model, the model is small in size and has a small number of parameters, which is convenient for local deployment and can provide faster response. At 404, the obtained cloud model is deployed on the cloud device, while the local model is deployed on the local device, so as to process the user inputs.

Figure 5:
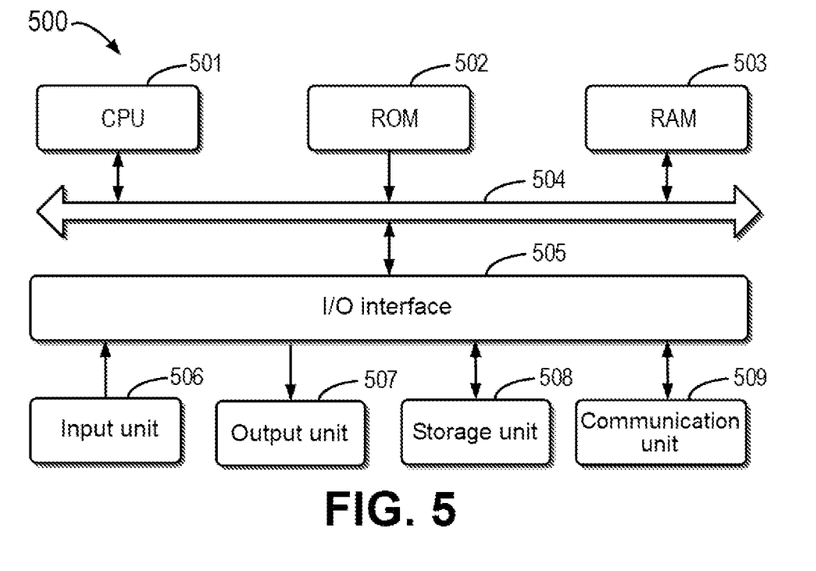
FIG. 5 illustrates a schematic block diagram of a device that can be used to implement embodiments of the present disclosure.

FIG. 5 illustrates a schematic block diagram of device 500 that can be used to implement embodiments of the present disclosure. Device 500 may be a device or an apparatus described in embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be executed by CPU 501. For example, in some embodiments, one or more methods or processes may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the method or process described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for processing faults, comprising:
   determining, by a first deep learning model on a storage device, whether a fault is caused by an environmental factor;
   determining, by a second deep learning model on the storage device in response to determining that the fault is caused by the environmental factor, whether the fault can be solved locally in the storage device;
   processing the fault according to a knowledge base in response to determining that the fault can be solved locally in the storage device; and sending the fault to a third deep learning model on a cloud device in response to determining that the fault cannot be solved locally in the storage device, the first deep learning model and the second deep learning model being obtained by model distillation of the third deep learning model.

2. The method according to claim 1, wherein determining whether the fault is caused by the environmental factor comprises:
   obtaining a title and a description for the fault, wherein the title and the description are connected as a whole to serve as an input feature;
   inputting the input feature into the first deep learning model for a binary classification operation; and
   determining, according to an output of the binary classification operation, whether the fault is caused by the environmental factor.

3. The method according to claim 1, wherein determining whether the fault can be solved locally in the storage device comprises:
   inputting an input feature into the second deep learning model for a multi-classification operation; and
   determining, according to an output of the multi-classification operation, whether the fault can be solved locally in the storage device.

4. The method according to claim 1, wherein sending the fault to the third deep learning model deployed in the cloud device comprises: inputting an input feature into the third deep learning model for a multi-classification operation.

5. The method according to claim 1, wherein the third deep learning model is trained at least in part through log data collected by a customer service system.

6. The method according to claim 1, wherein the third deep learning model comprises a BERT-based semantic representation model.

7. The method according to claim 1, further comprising:
   sending, in response to determining that the fault is not caused by the environmental factor, the fault to the third deep learning model for processing.

8. The method according to claim 1, wherein processing the fault according to the knowledge base comprises:
   in response to determining that the fault can be solved locally in the storage device, solving the fault locally in the storage device, and resetting the storage device.

9. An electronic device, comprising:
   a processing unit; and
   a memory coupled to the processing unit and storing instructions, wherein the instructions, when executed by the processing unit, cause the electronic device to perform the following actions:
   determining, by a first deep learning model on a storage device, whether a fault is caused by an environmental factor;
   determining, by a second deep learning model on the storage device in response to determining that the fault is caused by the environmental factor, whether the fault can be solved locally in the storage device;
   processing the fault according to a knowledge base in response to determining that the fault can be solved locally in the storage device; and
   sending the fault to a third deep learning model on a cloud device in response to determining that the fault cannot be solved locally in the storage device, the first deep learning model and the second deep learning model being obtained by model distillation of the third deep learning model.

10. The electronic device according to claim 9, wherein determining whether the fault is caused by the environmental factor comprises:
    obtaining a title and a description for the fault, wherein the title and the description are connected as a whole to serve as an input feature;
    inputting the input feature into the first deep learning model for a binary classification operation; and
    determining, according to an output of the binary classification operation, whether the fault is caused by the environmental factor.

11. The electronic device according to claim 9, wherein determining whether the fault can be solved locally in the storage device comprises:
    inputting an input feature into the second deep learning model for a multi-classification operation; and
    determining, according to an output of the multi-classification operation, whether the fault can be solved locally in the storage device.

12. The electronic device according to claim 9, wherein sending the fault to the third deep learning model deployed in the cloud device comprises: inputting an input feature into the third deep learning model for a multi-classification operation.

13. The electronic device according to claim 9, wherein the third deep learning model is trained at least in part through log data collected by a customer service system.

14. The electronic device according to claim 9, wherein the third deep learning model comprises a BERT-based semantic representation model.

15. The electronic device according to claim 9, wherein the actions further comprise:
    sending, in response to determining that the fault is not caused by the environmental factor, the fault to the third deep learning model for processing.

16. The electronic device according to claim 9, wherein processing the fault according to the knowledge base comprises:
    in response to determining that the fault can be solved locally in the storage device, solving the fault locally in the storage device, and resetting the storage device.

17. A computer program product that is tangibly stored on a non-transitory computer-readable medium and comprises computer-executable instructions, wherein the computer-executable instructions, when executed by a computer, cause the computer to perform the following:
    determining, by a first deep learning model on a storage device, whether a fault is caused by an environmental factor;
    determining, by a second deep learning model on the storage device in response to determining that the fault is caused by the environmental factor, whether the fault can be solved locally in the storage device;
    processing the fault according to a knowledge base in response to determining that the fault can be solved locally in the storage device; and
    sending the fault to a third deep learning model on a cloud device in response to determining that the fault cannot be solved locally in the storage device, the first deep learning model and the second deep learning model being obtained by model distillation of the third deep learning model.

18. The computer program product according to claim 17, wherein determining whether the fault is caused by the environmental factor comprises:

obtaining a title and a description for the fault, wherein the title and the description are connected as a whole to serve as an input feature;

inputting the input feature into the first deep learning model for a binary classification operation; and determining, according to an output of the binary classification operation, whether the fault is caused by the environmental factor.

19. The computer program product according to claim 17, wherein determining whether the fault can be solved locally in the storage device comprises:

inputting an input feature into the second deep learning model for a multi-classification operation; and determining, according to an output of the multi-classification operation, whether the fault can be solved locally in the storage device.

20. The computer program product according to claim 17, wherein sending the fault to the third deep learning model deployed in the cloud device comprises: inputting an input feature into the third deep learning model for a multi-classification operation.

* * * * *